C. W. HASENJAEGER.
AUTOMATIC SEED TESTER.
APPLICATION FILED APR. 29, 1916. RENEWED MAR. 8, 1918.
1,268,005.
Patented May 28, 1918.
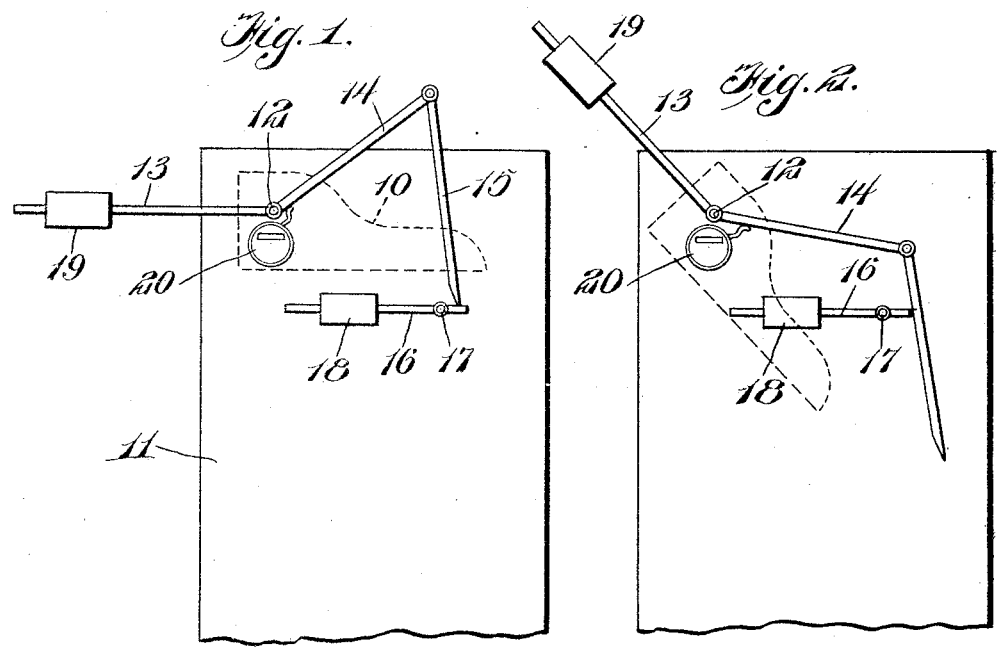
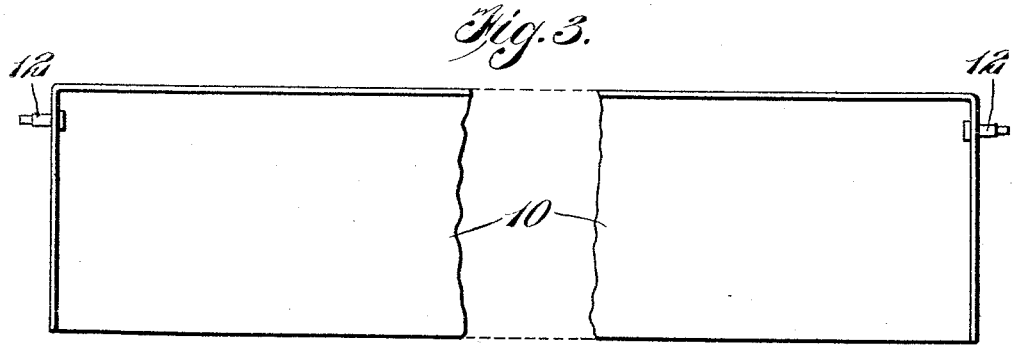
Inventor
C. W. Hasenjaeger
Witnesses
By Victor J. Evans
Attorney

UNITED STATES PATENT OFFICE.

CHARLES W. HASENJAEGER, OF MEMPHIS, TENNESSEE.

AUTOMATIC SEED-TESTER.

1,268,005.            Specification of Letters Patent.            Patented May 28, 1918.

Application filed April 29, 1916, Serial No. 94,514. Renewed March 8, 1918. Serial No. 221,325.

*To all whom it may concern:*

Be it known that I, CHARLES W. HASENJAEGER, a citizen of the United States, residing at Memphis, in the county of Shelby and State of Tennessee, have invented new and useful Improvements in Automatic Seed-Testers, of which the following is a specification.

This invention contemplates the provision of an automatic seed tester primarily intended for use in connection with cotton seed delinting machines.

Broadly stated the chief characteristic of the invention resides in the provision of an automatically operable gravity controlled mechanism for determining the quality of work accomplished by the machine.

The nature and advantages of the invention will be better understood when the following detailed description is considered in connection with the accompanying drawing, the invention residing in the construction, combination, and arrangement of parts as claimed.

In the drawing forming part of this specification, like numerals of reference denote similar parts in the several views, and in which:

Figure 1 is an end elevation showing the normal position of parts.

Fig. 2 is a similar view showing the hopper in discharge position.

Fig. 3 is a plan view of the hopper.

The device forming the subject matter of my invention includes a hopper 10 adapted to be pivotally mounted in the most advantageous position with respect to the machine for the purpose of receiving the cotton seeds as the latter are discharged from the machine. In this instance, however, the hopper is pivotally mounted within the discharge chute 11 for the machine, pivot bolts 12 projecting from the opposite ends of the hopper journaled in the adjacent walls of the chute. One of the pivot bolts 12 projects beyond its adjacent wall of the chute and mounted on said bolt is a lever having angularly disposed branches 13 and 14 respectively, the lever being connected with the bolt at the point of juncture of said branches. Freely pivoted to the extremity of the branch 14 and depending therefrom is an arm 15 adapted to normally rest upon the adjacent extremity of the rod 16, the latter being pivoted adjacent one of its ends, as at 17, to the adjacent wall of the chute 11. The rod 16 is normally disposed horizontal and has secured thereto a weighted member 18 under the influence of which the parts are normally held arranged in the manner illustrated in Fig. 1, wherein it will be noted that the hopper 10 is in receiving position. As above stated the hopper 10 is adapted to receive the cotton seeds as the latter are discharged from the machine, and when the hopper is filled it gravitates under the influence of a predetermined weight, thereby over-coming the combined weights of the rod 16 and weighted member 18, imparting rocking movement to the rod 16 which effects a release of the arm 15 and permits the hopper to assume the position illustrated in Fig. 2 from which the seed are discharged into the chute and conveyed to their proper destination. Immediately upon release of the arm 15, the weighted member 18 functionates to automatically return the rod 16 to normal position. Subsequent to the discharge of the material from the hopper 10, the weighted member 19 mounted upon the branch 13 of the lever above mentioned serves to automatically return the hopper 10 and its associated parts to normal position, during which operation the arm 15 reëngages the rod 16. Operatively associated with the mechanism is a recorder 20 adapted to record the number of times the hopper is tripped in a predetermined period of time.

Now, it is to be borne in mind that the capacity of the hopper is such that the same will gravitate to a discharge position under the influence of a predetermined weight, and the mechanism disclosed is provided with a view of determining the working conditions of the machine, and the quality of work accomplished thereby. For instance, the hopper 10 should be automatically tripped a predetermined number of times commensurate with the quantity of cotton seed fed to the machine in a given time, if the seeds coming from the machine are being perfectly cleaned. However, if the machine is not in perfect working condition, and an appreciable proportion of the seeds are being discharged therefrom imperfectly cleaned, that is to say being discharged with a certain amount of the cotton or lint still clinging to the seed, it will be obvious that the hopper will be tripped under the combined weights of the seeds and lint, but will not contain the same quantity of seeds that its capacity permits if all the seeds were perfectly cleaned, thereby necessitating the hopper to be tripped a greater number of times to discharge the total quantity of seeds fed to the machine in a given time, than it would if the seed were discharged in a perfectly clean condition. As above stated, the number of times the hopper is tripped is registered by the recorder 20, through the instrumentality of which the operator can determine the working conditions of the machine.

It is believed that from the foregoing description, the nature and advantages of the invention will be readily apparent, however, it is desired to have it understood that what is herein shown is merely illustrative of one embodiment of the invention to which I do not limit myself, and that such changes may be resorted to when desired as shown within the scope of what is claimed.

What is claimed is:—

1. An automatic cotton seed testing device for delinting machines, embodying a pivotally mounted hopper, an angular shaped lever associated therewith, means having connection with one branch of the lever for normally holding the hopper in receiving position, said hopper being capable of assuming a discharge position under the weight of its contents, and a weighted member on the other branch of said lever for returning the latter and its associated parts to normal position.

2. An automatic cotton seed testing device for delinting machines, embodying a pivotally mounted hopper, an angular shaped lever associated therewith, means having connection with one branch of the lever for normally holding the hopper in receiving position, said hopper being capable of assuming a discharge position under the weight of its contents, a weighted member on the other branch of said lever for returning the latter and its associated parts to normal position, and means for recording the operations of said hopper.

3. An automatic cotton seed testing device for delinting machines embodying a movable hopper, an angular shaped lever connected thereto, a finger depending from one branch of the lever and pivotally connected to the same, a movable element constituting a rest for said finger whereby the hopper is normally held in receiving position, said hopper being capable of assuming a discharge position under the weight of its contents, and a weighted member on the other branch of said lever for returning the latter and its associated parts to normal position.

4. An automatic cotton seed testing device for delinting machines, embodying a pivotally mounted hopper, an angular shaped lever connected thereto, a finger depending from one branch of the lever and pivotally connected to the same, a weighted rod pivotally mounted beneath the hopper and constituting a support for said finger whereby the hopper is normally held in receiving position, said hopper being capable of assuming a discharge position under the weight of its contents, and a weighted member on the other branch of the said lever for automatically returning the hopper and its associated parts to normal position.

In testimony whereof I affix my signature.

CHARLES W. HASENJAEGER.

Copies of this patent may be obtained for five cents each, by addressing the "Commissioner of Patents, Washington, D. C."